(12) United States Patent
Seo et al.

(10) Patent No.: US 9,730,243 B2
(45) Date of Patent: Aug. 8, 2017

(54) METHOD AND DEVICE FOR TRANSMITTING UPLINK SIGNAL IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 14/766,024

(22) PCT Filed: Feb. 5, 2014

(86) PCT No.: PCT/KR2014/000985
§ 371 (c)(1),
(2) Date: Aug. 5, 2015

(87) PCT Pub. No.: WO2014/123352
PCT Pub. Date: Aug. 14, 2014

(65) Prior Publication Data
US 2015/0373739 A1 Dec. 24, 2015

Related U.S. Application Data

(60) Provisional application No. 61/761,695, filed on Feb. 6, 2013.

(51) Int. Cl.
*H04W 74/00* (2009.01)
*H04W 72/04* (2009.01)
(Continued)

(52) U.S. Cl.
CPC ............ *H04W 74/002* (2013.01); *H04L 1/00* (2013.01); *H04L 5/0055* (2013.01);
(Continued)

(58) Field of Classification Search
CPC .. H04B 7/14; H04J 3/16; H04J 37/604; H04L 1/1829; H04L 5/00; H04W 72/04; H04W 72/1289; H04W 74/00; H04W 92/00
See application file for complete search history.

(56) References Cited

U.S. PATENT DOCUMENTS

2011/0299452 A1   12/2011  Seo et al.
2011/0310833 A1*  12/2011  Lee ....................... H04L 1/1829
                                                  370/329

(Continued)

FOREIGN PATENT DOCUMENTS

KR  10-2010-0091926 A    8/2010
KR  10-2011-0121673 A   11/2011
(Continued)

*Primary Examiner* — Andrew Lai
*Assistant Examiner* — Leon Andrews
(74) *Attorney, Agent, or Firm* — Birch, Stewart, Kolasch & Birch, LLP (57) ABSTRACT

A user equipment (UE) is provided in a long term evolution (LTE) frequency division duplex (FDD) system. The UE receives a downlink control information (DCI) including a UL grant for transmitting the UL signal in an N-th subframe, and transmits the UL signal using the UL grant, in at least one of an (N+4)-th subframe and an (M+4)-th subframe. An M-th subframe is a subframe in which both of a physical downlink control channel (PDCCH) and an enhanced PDCCH (EPDCCH) are not transmitted. N and M are integers, and M is greater than N.

14 Claims, 6 Drawing Sheets

(51) Int. Cl.
*H04L 5/00* (2006.01)
*H04L 1/00* (2006.01)
*H04W 88/02* (2009.01)

(52) U.S. Cl.
CPC ......... *H04W 72/04* (2013.01); *H04W 72/042* (2013.01); *H04W 72/0406* (2013.01); *H04W 88/02* (2013.01)

(56) References Cited

U.S. PATENT DOCUMENTS

| | | |
|---|---|---|
| 2011/0317614 A1 | 12/2011 | Park et al. |
| 2014/0086112 A1* | 3/2014 | Stern-Berkowitz ... H04W 72/1289 370/280 |
| 2014/0140273 A1 | 5/2014 | Kim et al. |

FOREIGN PATENT DOCUMENTS

| | | |
|---|---|---|
| WO | WO 2010/052566 A2 | 5/2010 |
| WO | WO 2011/127098 A1 | 10/2011 |
| WO | WO 2013/006010 A2 | 1/2013 |

* cited by examiner

(a) UL-DL configuration 1

(b) Interpretation of UL index

FIG. 8

METHOD AND DEVICE FOR TRANSMITTING UPLINK SIGNAL IN WIRELESS COMMUNICATION SYSTEM

CROSS REFERENCE TO RELATED APPLICATIONS

This application is the National Phase of PCT International Application No. PCT/KR2014/000985, filed on Feb. 5, 2014, which claims priority under 35 U.S.C. 119(e) to U.S. Provisional Application No. 61/761,695, filed on Feb. 6, 2013, all of which are hereby expressly incorporated by reference into the present application.

TECHNICAL FIELD

The present invention relates to a wireless communication system, and more particularly, to a method and device for transmitting uplink signal in wireless communication system.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Task

The technical task of the present invention is to provide a method of transmitting an uplink grant in a subframe in which the uplink grant is difficult to be transmitted.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of transmitting an uplink signal, which is transmitted by a user equipment in a wireless communication system, including the steps of receiving a downlink control information including an uplink grant and transmitting uplink data in a $k^{th}$ subframe from a subframe having the uplink grant received therein, wherein the uplink grant is also applied to an Lth subframe from a $1^{st}$ subframe appearing after the subframe having the uplink grant received therein.

In a $2^{nd}$ technical aspect of the present invention, provided herein is a user equipment in a wireless communication system, including a receiving module and a processor receiving a downlink control information including an uplink grant, the processor transmitting uplink data in a $k^{th}$ subframe from a subframe having the uplink grant received therein, wherein the uplink grant is also applied to an Lth subframe from a $1^{st}$ subframe appearing after the subframe having the uplink grant received therein.

The following matters may be included in the $1^{st}$ to $2^{nd}$ technical aspects of the present invention.

Preferably, the uplink grant applied to the Lth subframe from the 1st subframe may be masked with US-RNTI (uplink scheduling-radio network temporary identifier).

Preferably, the 'L' may be indicated by a prescribed field included in the downlink control information.

More preferably, the prescribed field may include an offset value between the subframe having the uplink grant received therein and the $1^{st}$ subframe.

Further preferably, the downlink control information may include an uplink index having a value set to 11.

Preferably, if a value of an uplink index is set to 01, the uplink grant may not be applied to the Lth subframe.

Preferably, an MBSFN (multimedia broadcast single frequency network) subframe may be transmitted in the subframe.

More preferably, a reception of the downlink control information and a transmission of the uplink data may be performed on NCT (new carrier type).

Preferably, in the subframe, resources except a resource for at least one of PMCH (physical multicast channel) and PRS (positioning reference signal) may be smaller than those required for transmitting the downlink control information.

Preferably, in the subframe, either the PMCH or the PRS is transmitted using CP (cyclic prefix) different from the downlink control information.

Preferably, the $1^{st}$ subframe may be indicated to the user equipment through upper layer signaling.

Preferably, if a duplex mode of the user equipment is FDD, a value of the 'k' may be equal to that of the 'L'.

Advantageous Effects

According to the present invention, uplink resources can be efficiently used since HARQ timing can be maintained in a manner of enabling a transmission of an uplink grant information on a subframe in which an uplink grant is difficult to be transmitted.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

Figure 1:
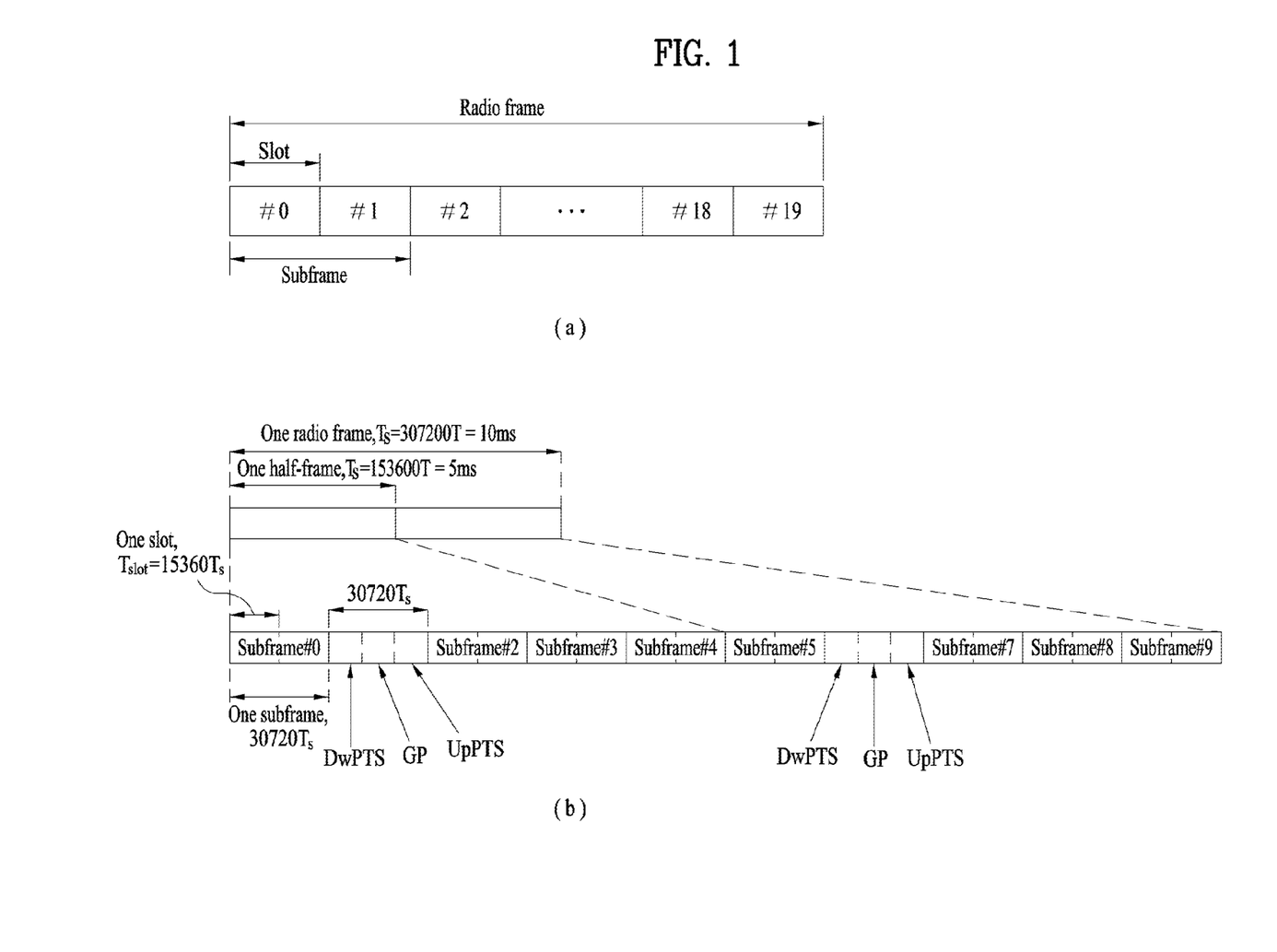
FIG. 1 is a diagram for a structure of a radio frame.

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
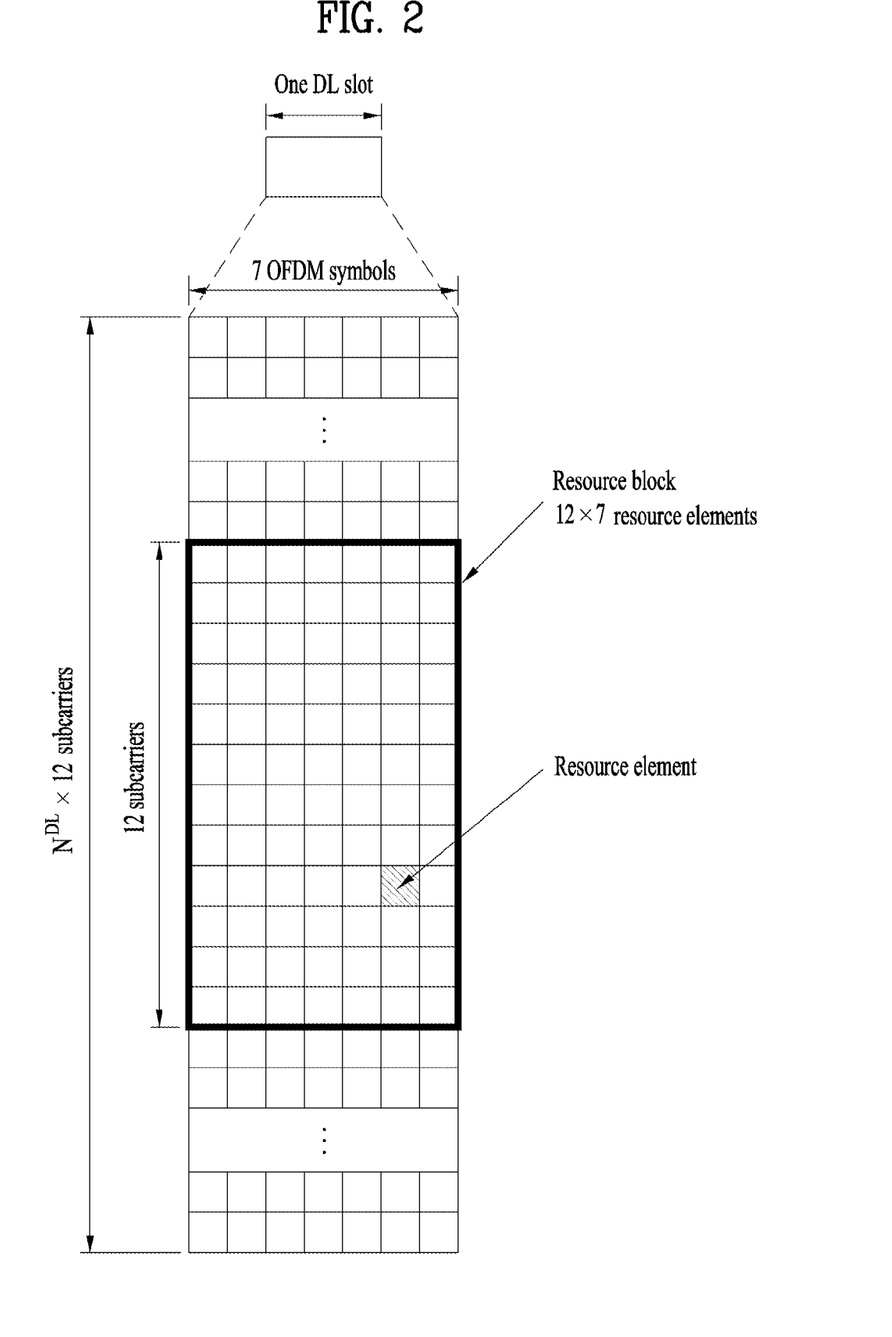
FIG. 2 is a diagram of a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number $N^{DL}$ of RBs included in a downlink slot depends on a DL transmission bandwidth. A UL slot may have the same structure as a DL slot.

Figure 3:
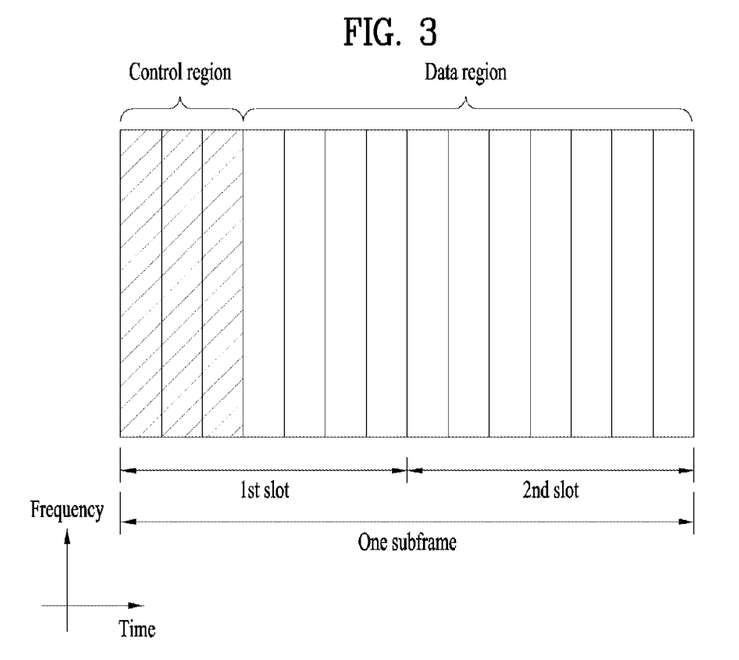
FIG. 3 is a diagram for a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
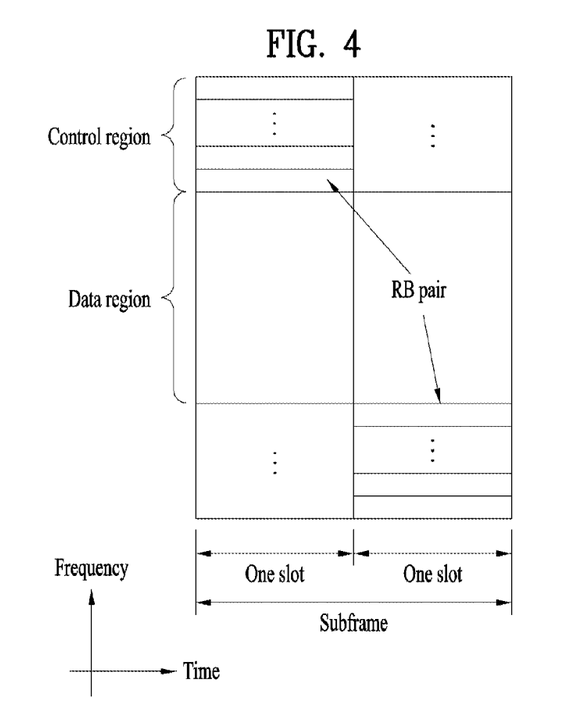
FIG. 4 is a diagram for a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

DCI Format

According to the current LTE-A (release 10), DCI formats 0, 1, 1A, 1B, 1C, 1D, 2, 2A, 2B, 2C, 3, 3A and 4 are defined. In this case, the DCI formats 0, 1A, 3 and 3A are stipulated to have the same message size in order to reduce the number of times of blind decodings that will be described in the following. The DCI formats may be divided into i) DCI formats 0 and 4 used for an uplink grant, ii) DCI formats 1, 1A, 1B, 1C, 1D, 2, 2A, 2B and 2C used for downlink scheduling assignment and iii) DCI formats 3 and 3A for a power control command, according to usage of a control information to be transmitted.

In case of the DCI format 0 used for the uplink grant, it may include a carrier offset (carrier indicator) necessary for and related to carrier aggregation mentioned in the following description, an offset (flag for format 0/format 1A differentiation) used for distinguishing between the DCI formats 0 and 1A, a hopping flag (frequency hopping flag) for informing whether frequency hopping is used in an uplink PUSCH transmission, an information (resource block assignment) on assignment of a resource block that needs to be used for a PUSCH transmission by a user equipment, a modulation and coding scheme, a new data indicator used to empty a buffer for an initial transmission related to an HARQ process, a transmit power control command for PUSCH (TPC command for scheduled for PUSCH), a cyclic shift information (cyclic shift for DMRS and OCC index) for DMRS (demodulation reference signal), a UL index necessary for a TDD operation, a channel quality information (channel quality indicator) request information (CSI request) and the like. On the other hand, in case of the DCI format 0, it may not include a redundancy version like DCI formats related to downlink scheduling assignment since the DCI format 0 uses a synchronous HARQ. In case of the carrier offset, it may not be included in the DCI formats unless cross carrier scheduling is used.

The DCI format 4, which is newly added in the LTE-A release 10, supports that spatial multiplexing is applied to an uplink transmission in the LTE-A. In case of the DCI format 4, compared to the DCI format 0, it has a large message size since the DCI format 4 further includes informations for the spatial multiplexing. And, the DCI format 4 further includes an additional control information as well as a control information included in the DCI format 0. In particular, in case of the DCI format 4, it further includes a modulation and coding scheme for a $2^{nd}$ transport block, a precoding information for a multi-antenna transmission and a sounding reference signal (SRS) request information. Meanwhile, the DCI format 4 does not include an offset for distinguishing between the DCI formats 0 and 1A since the DCI format 4 has a larger size than the DCI format 0.

The DCI formats 1, 1A, 1B, 1C, 1D, 2, 2A, 2B and 2C related to the downlink scheduling assignment may be mainly classified into the DCI formats 1, 1A, 1B, 1C and 1D, which do not support the spatial multiplexing, and the DCI formats 2, 2A, 2B and 2C, which support the spatial multiplexing.

The DCI format 1C as a compact downlink assignment supports a continuous frequency assignment only and does not include the carrier offset and the redundancy version compared to other formats.

The DCI format 1A is the format for downlink scheduling and a random access procedure. The DCI format 1A may include the carrier offset, an indicator for informing whether a downlink distributive transmission is used, a PDSCH resource allocation information, the modulation and coding scheme, the redundancy version, an HARQ processor number for informing a processor used for soft combining, a new data offset used to empty the buffer for the initial transmission in respect of the HARQ process, a transmit power control command for PUCCH, an uplink index required for a TDD operation and the like.

Control informations of the DCI format 1 are mostly similar to those of the DCI format 1A. However, the DCI format 1A is related to continuous resource allocation, whereas the DCI format 1 supports discontinuous resource allocation. Therefore, control signaling overhead is slightly increased as a trade-off of an increase in flexibility of resource allocation since the DCI format 1 further includes a resource allocation header.

The DCI formats 1B and 1D are common to each other in that the DCI formats 1B and 1D further include precoding informations compared to the DCI format 1. The DCI format 1B includes a PMI confirmation and the DCI format 1D includes a downlink power offset information. Other control informations included in each of the DCI formats 1B and 1D mostly coincides with those of the DCI format 1A.

The DCI format 2, 2A, 2B and 2C basically include most of the control informations included in the DCI format 1A and further include informations for the spatial multiplexing. In this case, the informations for the spatial multiplexing correspond to the modulation and coding scheme for the $2^{nd}$ transport block, the new data offset and the redundancy version.

The DCI format 2 supports closed-loop spatial multiplexing and the DCI format 2A supports open-loop spatial multiplexing. Both of the DCI format 2 and 2A include the precoding informations. The DCI format 2B supports dual layer spatial multiplexing combined with beamforming and further includes the cyclic shift information for the DMRS. The DCI format 2C may be understood as extension of the DCI format 2B and supports the spatial multiplexing up to eight layers.

The DCI format 3 and 3A may be used to complement transmit power control informations included in the DCI formats for the aforementioned uplink grant and downlink scheduling assignment, i.e., to support semi-persistent scheduling. A command of 1 bit per user equipment is used in case of the DCI format 3 and a command of 2 bits per user equipment is used in case of the DCI format 3A.

One of the above-mentioned DCI formats is transmitted through one PDCCH and a plurality of PDCCHs may be transmitted in a control region. A user equipment may monitor a plurality of the PDCCHs.

Reference Signal (RS)

Since a packet is transmitted through a radio channel in a wireless communication system, a signal distortion may occur during a transmission process. In order for a receiving side to receive a distorted signal correctly, the receiving side should correct the distortion of a received signal using a channel information. In order to obtain the channel information, a signal known to both a transmitting side and the receiving side is transmitted. And, a method of obtaining the channel information using a distortion level in receiving the signal through a channel is mainly used. In this case, the signal known to both of the transmitting side and receiving side is referred to as a pilot signal or a reference signal.

In case that multiple antennas are used to transmit and receive data, a channel state between each of transmitting antennas and receiving antennas should be known in order to receive a correct signal. Therefore, a separate reference signal needs to exist for each of the transmitting antennas, in more detail, for each antenna port.

The reference signal may be divided into an uplink reference signal and a downlink reference signal. In the current LTE system, the uplink reference signal may include:

i) a demodulation reference signal (DM-RS) for channel estimation for coherent demodulation of an information transmitted through PUSCH and PUCCH; and ii) a sounding reference signal (SRS) for enabling a base station to measure an uplink channel quality of a frequency of a different network.

On the other hand, the downlink reference signal may include:

i) a cell-specific reference signal (CRS) shared by all user equipments within a cell;

ii) a UE-specific reference signal for a specific user equipment only;

iii) a demodulation reference signal (DM-RS) transmitted for coherent demodulation in case that PDSCH is transmitted;

iv) a channel state information-reference signal (CSI-RS) for delivering a channel state information (CSI) in case that a downlink DMRS is transmitted;

v) a multimedia broadcast single frequency network (MBSFN) reference signal transmitted for coherent demodulation for a signal transmitted in MBSFN mode; and vi) a positioning reference signal used to estimate a geographic location information of a user equipment.

The reference signal may be classified into two types in accordance with its purpose. In particular, it may be classified into a reference signal for obtaining a channel information and a reference signal used for data demodulation. Since the former reference signal is for UE to obtain the channel information on downlink, it needs to be transmitted through a wideband. And, the former reference signal should be received even by a user equipment that does not receive downlink data in a specific subframe. Moreover, this reference signal is used in a situation of handover as well. The latter reference signal corresponds to a reference signal transmitted from a base station together with a corresponding resource when the base station transmits downlink data. In this case, the user equipment performs a channel measurement by receiving the corresponding reference signal, whereby the user equipment is able to demodulate data. This reference signal should be transmitted in a region in which data is transmitted.

The CRS is used for the purposes of both channel information acquisition and data demodulation. The UE-specific reference signal is used for data demodulation only. The CRS is transmitted in each subframe for a wideband and the reference signals for maximum 4 antenna ports are transmitted depending on the number of transmitting antennas of the base station.

For instance, in case that the number of the transmitting antennas of the base station is 2, the CRS for each of antenna ports #0 and #1 are transmitted. In case that the number of the transmitting antennas is 4, the CRS for each of antenna ports #0 to #3 is transmitted.

Figure 5:
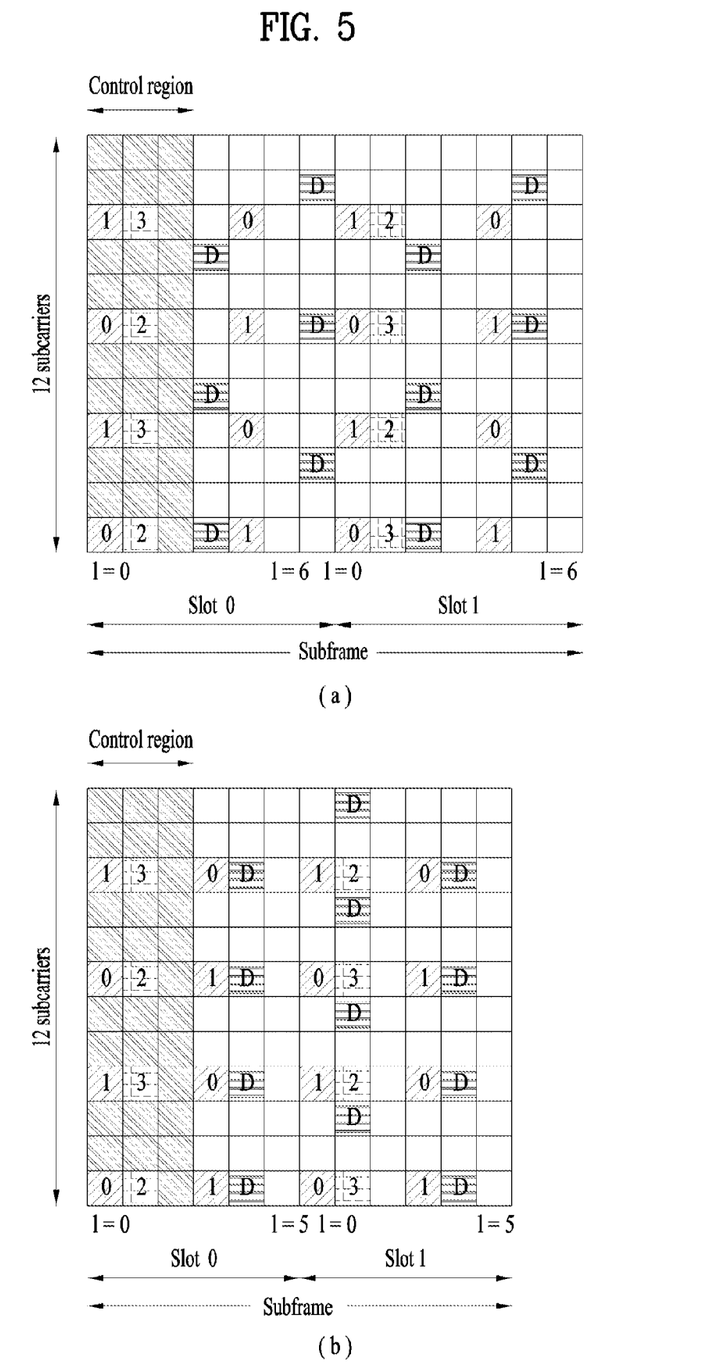
FIG. 5 is a diagram to describe a reference signal.

FIG. 5 is a diagram of a pattern for CRS and DRS defined in a conventional 3GPP LTE system (e.g., Release-8) to be mapped to a downlink resource block (RB) pair. A downlink resource block pair as a unit of mapping a reference signal may be expressed as a unit of '(1 subframe in time)×(12 subcarriers in frequency)'. In particular, a single RB pair has a length of 14 OFDM symbols in time in case of a normal CP (FIG. 5(a)) or a length of 12 OFDM symbols in time in case of an extended CP (FIG. 5(b)).

FIG. 5 shows a location of a reference signal on an RB pair in a system that a base station supports 4 transmitting antennas. In FIG. 5, resource elements (REs) marked with '0', '1', '2' and '3' represent locations of CRSs for antenna port indexes 0, 1, 2 and 3, respectively. Meanwhile, a resource element marked with 'D' in FIG. 5 indicates a location of DMRS.

Enhanced-PDCCH (EPDCCH)

In an LTE system after Release 11, an enhanced-PDCCH (EPDCCH), which may be transmitted through an existing PDSCH region, is considered as solutions for lack of capacity of PDCCH caused by CoMP (coordinate multi point), MU-MIMO (multi user-multiple input multiple output) and the like and degradation of PDCCH performance due to inter-cell interference. Moreover, in order to obtain a precoding gain and the like, channel estimation may be performed on the EPDCCH based on the DMRS contrary to the existing PDCCH based on the CRS.

EPDCCH transmission may be classified into a localized EPDCCH transmission and a distributed EPDCCH transmission depending on a configuration of a PRB (physical resource block) pair used for the EPDCCH transmission. The localized EPDCCH transmission represents a case that ECCEs used for a single DCI transmission are adjacent to each other in frequency domain. And, specific precoding may be applied to the localized EPDCCH transmission in order to obtain beamforming gain. For instance, the localized EPDCCH transmission may be based on consecutive ECCEs the number of which corresponds to aggregation level. On the other hand, the distributed EPDCCH transmission represents a transmission of one EPDCCH in a PRB pair separated in frequency domain. And, it has an advantage with regard to frequency diversity. For instance, the distributed EPDCCH transmission may be based on ECCE constructed with 4 EREGs included in each PRB pair separated in frequency domain. In case of a user equipment, one or two EPDCCH (PRB) sets may be configured through upper layer signaling and the like. And, each of the EPDCCH PRB sets is for one of the localized EPDCCH transmission and the distributed EPDCCH transmission. In case that two EPDCCH PRB sets exist, some/whole part of the two EPDCCH PRB sets may be overlapped to each other.

Figure 7:
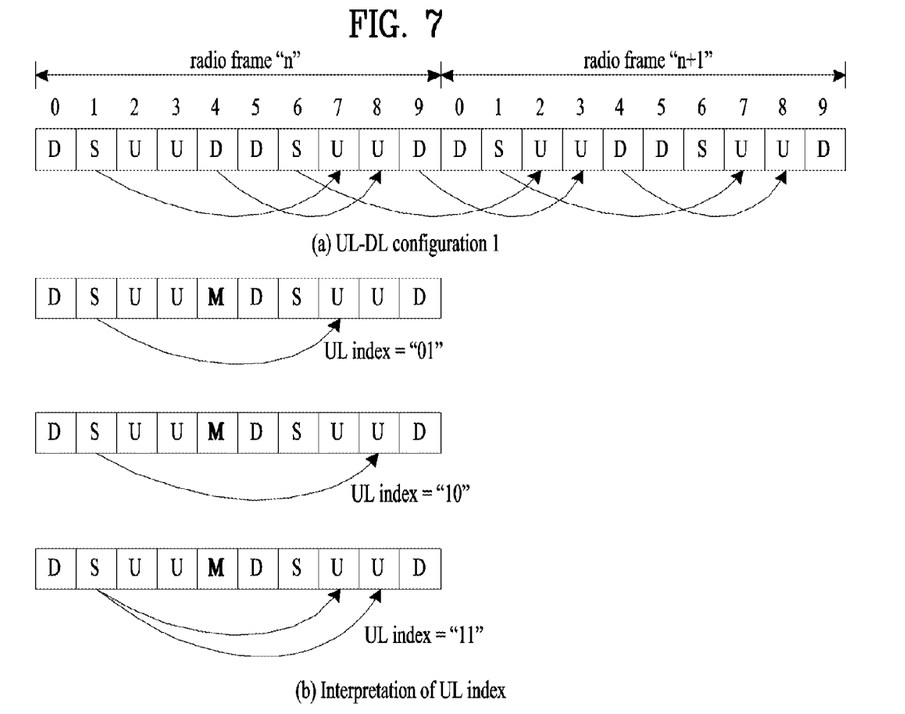

A base station may transmit a control information by mapping the control information to REs of EREG assigned for EPDCCH in at least one EPDCCH PRB set. In this case, the EREG is used to define mapping of the control information to the REs and 16 EREGs (EREGs #0 to #15) may exist in one PRB pair. One ECCE may include 4 EREGs (or 8 EREGs in some cases). One EPDCCH may include x of EREGs (x is set to one of 1, 2, 4, 8, 16 and 32). In case of the distributed EPDCCH transmission, one ECCE may include EREGs existing in several PRB pairs for diversity. In more detail, in case of the distributed EPDCCH transmission, EREG-to-ECCE mapping (hereinafter referred to as 1st ECCE number-EREG number-PRB number relation) may represent that 'an ECCE index in the EPDCCH PRB set corresponds to an EREG index $$\left\lfloor \frac{N_{ECCE}}{N_P} \right\rfloor + i \times N_{CP}$$

in a PRB pair index $$\left(n_{ECCE} + i \times \max\left(1, \left\lfloor \frac{N_P}{N} \right\rfloor\right)\right) \mod N_P\text{'}.$$

In this case, the N denotes the number of EREGs per ECCE, $N_{CP}$ denotes the number of ECCEs per PRB pair, $N_{P,set1}$ denotes the number of PRB pairs of a 1st EPDCCH PRB set, $N_{P,set2}$ denotes the number of PRB pairs of a $2^{nd}$ EPDCCH PRB set, and i=0, 1, ..., N−1. For instance, in case that 4 PRB pairs are included in an EPDCCH PRB set, ECCE index #0 is configured with EREG #0 of PRB pair #0, EREG #4 of PRB pair #1, EREG #8 of PRB pair #2, and EREG #12 of PRB pair #4 according to the above-mentioned 1st ECCE number-EREG number-PRB number relation. The above EREG-to-ECCE mapping relation is shown in FIG. 7.

A user equipment may perform blind decoding similar to a conventional LTE/LTE-A system in order to receive/obtain a control information (DCI) through EPDCCH. In more detail, the user equipment may attempt to perform decoding (monitoring) on a set of EPDCCH candidates per aggregation level for DCI formats corresponding to configured transmission modes. In this case, the set of the EPDCCH candidates that becomes a target for monitoring may be called an EPDCCH UE specific search space and the search space may be configured/constructed per aggregation level. Moreover, the aggregation level may become {1, 2, 4, 8, 16, 32} depending on a subframe type, a length of CP, an available resource amount in a PRB pair and the like slightly different from the aforementioned conventional LTE/LTE-A system.

In case of EPDCCH configured UE, REs included in the PRB pair is indexed with EREG and the EREG may be indexed by ECCE unit again. The UE determines an EPDCCH candidate included in the search space based on the indexed ECCE and then performs the blind decoding, whereby the UE may receive control information.

After having received the EPDCCH, the user equipment may transmit ACK/NACK for the EPDCCH on PUCCH. In this case, an index of a used resource i.e., a PUCCH resource may be determined by an index of ECCE having a lowest index among ECCEs used for an EPDCCH transmission. In particular, it can be represented as Formula 1 in the following.

$$n_{PUCCH\text{-}ECCE}^{(1)} = n_{ECCE} + N_{PUCCH}^{(1)} \quad \text{[Formula 1]}$$

In Formula 1, $n_{PUCCH-ECCE}^{(1)}$ denotes the PUCCH resource index, $n_{ECCE}$ denotes the index of the ECCE having the lowest index among the ECCEs used for the EPDCCH transmission, and $N_{PUCCH}^{(1)}$ (it may be expressed as $N_{PUCCH,EPDCCH}^{(1)}$) denotes a starting point of the PUCCH resource index as a value transmitted through upper layer signaling.

However, if PUCCH resource indices are uniformly determined according to the above-mentioned Formula 1, a resource collision problem may occur. For instance, in case that two EPDCCH PRB sets are configured, a lowest ECCE index of one EPDCCH PRB set may be identical to that of another EPDCCH PRB set since ECCE indexing of the two EPDCCH PRB sets is independent from each other. In this case, the above-mentioned problem may be solved in a manner of making a starting point of a PUCCH resource different for each user. However, if the starting point of the PUCCH resource is different for each user, it may be inefficient since a lot of PUCCH resources are reserved. Moreover, in case of the EPDCCH, since DCIs of a plurality of users may be transmitted in the same ECCE location like MU-MIMO, a method of allocating a PUCCH resource is required. To solve the above-mentioned problem, an HARQ-ACK resource offset (ARO) has been introduced. The ARO enables a collision between PUCCH resources to be avoided by shifting a lowest ECCE index among ECCE indices included in the EPDCCH and a PUCCH resource determined by a starting offset of a PUCCH resource transmitted through upper layer signaling by prescribed degrees. The ARO is indicated through 2 bits of DCI format 1A/1B/1D/1/2A/2/2B/2C/2D and represented as Table 1 in the following.

TABLE 1

| ACK/NACK Resource offset field in DCI format 1A/1B/1D/1/2A/2/2B/2C/2D | delta ARO |
|---|---|
| 0 | 0 |
| 1 | −1 |
| 2 | −2 |
| 3 | 2 |

After having designated one of ARO values in Table 1 for a specific user equipment, a base station may inform the specific user equipment of ARO, which will be used in determining a PUCCH resource, through a DCI format. The user equipment detects an ARO field from its DCI format and may then transmit an acknowledgement through the PUCCH resource determined using the ARO value.

MBSFN (Multimedia Broadcast Single Frequency Network) Transmission

MBMS (multimedia broadcast/multicast service) means a service for multicasting or broadcasting a specific information. The MBMS in LTE targets 1 bps/Hz of spectral efficiency at a cell edge. To this end, an SFN (single frequency network) transmission has been introduced. The SFN transmission of the MBMS is called an MBSFN transmission.

In an MBSFN operation, a plurality of neighbor base stations transmit the same data and a user equipment recognizes it as data transmission from one base station through a channel, in which a signal is spread depending on time. To this end, a time difference between the base stations is limited to within a CP length (only extended CP used in an MBSFN subframe) in order to reduce inter-symbol interference. Moreover, in order to prevent a normal RS and an RS for the MBSFN from being mixed with each other, FDM is not performed together with PDSCH. Furthermore, a subframe in which a synchronizing signal, a paging signal and the like are transmitted may not be used as an MBSFN subframe. In more detail, subframes #0, #4, #5 and #9 may not be set to the MBSFN subframe in case of FDD and subframes #0, #1, #5 and #6 may not be set to the MBSFN subframe in case of TDD.

Although PDCCHs are transmitted in maximum 2 OFDM symbols of the MBSFN subframe, scheduling for MBSFN data is performed through an upper layer. And, uplink grants are transmitted on the PDCCHs only.

In case that the above-mentioned MBSFN subframe is configured on NCT (new carrier type), an uplink grant may not be transmitted in the corresponding subframe. In more detail, the NCT means a new type of a carrier in which CRS and PDCCH are not transmitted. Moreover, due to no transmission of PDCCH and a region for MBSFN transmission, EPDCCH may not be transmitted as well. In particular, the uplink grant may not be transmitted in a subframe set to the MBSFN subframe of the NCT. Therefore, a method of transmitting an uplink grant, which should be transmitted in the above-mentioned subframe, is described in the present invention. Although it will be described later, the following embodiments can be applied to a case that a control information may not be transmitted in a subframe in which an uplink grant transmission is predetermined as well as to a subframe set to the MBSFN subframe of the NCT. The above-mentioned subframe is named a $1^{st}$ subframe in the following description.

$1^{st}$ Embodiment

Figure 6:
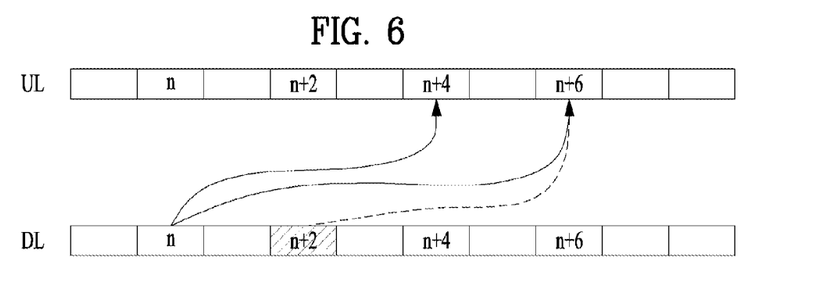
FIGS. 6 to 8 are diagrams to describe the embodiments of the present invention.

A $1^{st}$ embodiment relates to a method of commonly indicating an uplink grant, which needs/is predetermined to be transmitted in a $1^{st}$ subframe, in a different subframe. In more detail, a user equipment, which receives DCI including an uplink grant, may transmit an uplink signal in a $k^{th}$ subframe from a subframe having the DCI received therein through a resource identified by the uplink grant. In this case, the above uplink grant may be configured to be simultaneously applied to an $L^{th}$ subframe from the $1^{st}$ subframe appearing after (or before) the subframe having the uplink grant received therein as well. In other words, the uplink grant is considered as an uplink grant that cannot be transmitted in the $1^{st}$ subframe. FIG. 6 shows one example of the $1^{st}$ embodiment. In FIG. 6, FDD is assumed. Thus, the 'k' and the 'L' are equal to each other and each of the 'k' and the 'L' is set to 4. Moreover, the $1^{st}$ subframe corresponds to a subframe (n+2) and is expressed as shade. Referring to FIG. 6, a user equipment receives the uplink grant in a subframe n. In this case, the uplink grant may indicate resource allocation in an uplink subframe (n+4) and indicate resource allocation in a subframe (n+6) at the same time.

As mentioned in the foregoing description, the uplink grant may be used for the $k^{th}$ subframe from the subframe having the uplink grant received therein and the $L^{th}$ subframe from the $1^{st}$ subframe. In this case, it may be distinguished by RNTI that the uplink grant is used for which one of the above two subframes. In more detail, in case that a control information including the uplink grant is masked with RNTI (e.g., US (UL scheduling) RNTI, etc.) for the $1^{st}$ subframe, the uplink grant may be used for the Lth subframe from the $1^{st}$ subframe. In particular, if the user equipment performs decoding on the control information using US-RNTI, the user equipment may recognize that the uplink grant is applied to the $L^{th}$ subframe from the $1^{st}$ subframe. Moreover, if the user equipment performs decoding on the control information using different RNTI other than US-RNTI, the user equipment may recognize that the uplink grant is applied to the $k^{th}$ subframe from the subframe having the uplink grant received therein. In case that a plurality of $L^{th}$ subframes exist, a plurality of US-RNTIs may be used.

Alternatively, an offset between the subframe having the uplink grant received therein and the $1^{st}$ subframe may be indicated through a new DCI format or a specific/reserved field of an existing DCI format.

For another example, the existing DCI format may be used in case of the uplink grant that is not masked with the US-RNTI and the new DCI format may be used in case of the uplink grant that is masked with the US-RNTI. If at least three uplink grants are received in one subframe, a base station can indicate to a user equipment that how many uplink grants are transmitted. As a particular example, the number of uplink grants transmitted in a subframe may be determined depending on a pattern of the US-RNTI.

In the above-mentioned description, the meaning of a value of an uplink index field may be newly defined. In particular, the uplink grant is pre-scheduled using the uplink index field. FIG. 7 shows a related example. Referring to FIG. 7, a downlink grant is received in subframe #1 of a radio frame n. In this case, if the uplink index field value corresponds to 01, it may be indicated that the uplink grant relates to subframe #7 as defined previously. If the uplink index field value corresponds to 10, it may be indicated that the uplink grant relates to the $1^{st}$ subframe (i.e., subframe marked with 'M'). Moreover, if the uplink index field value corresponds to 11, it may be indicated that the uplink grant relates to both of the subframe having the uplink grant received therein and the $1^{st}$ subframe.

$2^{nd}$ Embodiment

Figure 8:
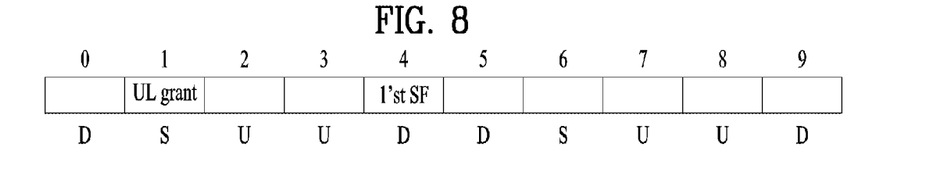

An uplink grant that needs to be transmitted in a $1^{st}$ subframe may be transmitted (or retransmitted) in a closest downlink subframe among downlink subframes before 4 ms (or predefined value) from a PUSCH transmission timing interconnected to an uplink grant transmission timing based on a conventional uplink HARQ timeline. For instance, referring to FIG. 8, the uplink grant that is not transmitted in the $1^{st}$ subframe (SF) is transmitted in subframe #1, which is the closest subframe, of subframes #0 and #1 corresponding to downlink subframes before 4 ms from subframe #8 corresponding to the PUSCH transmission timing interconnected to the uplink transmission timing based on the conventional timeline. In this case, the downlink subframe in which the uplink grant is transmitted may correspond to a downlink subframe (e.g., standalone DL SF) on which an uplink grant transmission based on the conventional uplink HARQ timeline is not performed, a downlink subframe on which the uplink grant transmission based on the conventional uplink HARQ timeline is performed, and/or every downlink subframe.

If the uplink grant transmission timing may not be designated as a specific downlink subframe although it is operated according to the $2^{nd}$ embodiment, a base station and a user equipment may assume that PUSCH transmission based on the corresponding uplink grant is not performed. In particular, in case that the uplink grant is not transmitted in the subframe in which the uplink grant needs to be transmitted, it may be previously defined that the PUSCH transmission interconnected to the corresponding uplink grant is omitted.

$3^{rd}$ Embodiment

In case that an uplink grant is difficult to be transmitted in a $1^{st}$ subframe, even if a separate uplink grant does not exist, a user equipment may perform a retransmission on a subframe corresponding to the uplink grant (i.e., uplink grant of which transmission is predetermined). For instance, referring to FIG. 8, the user equipment may perform an uplink transmission on subframe #8 even if the uplink grant does not exist. In this case, a base station may request a higher MCS than an optimized MCS to the user equipment. Alternatively, in case that PHICH and the uplink grant related to one uplink subframe are configured to be transmitted in different subframes, if the uplink grant is not transmitted, the user equipment may operate based on the PHICH. In particular, in case of ACK, it is assumed that a PUSCH transmission is not performed on the corresponding uplink subframe. In case of NACK, although a retransmission is performed on the corresponding uplink subframe, a PUSCH configuration may be determined based on the most recently received uplink grant.

$4^{th}$ Embodiment

As another embodiment, in case that a $1^{st}$ subframe corresponds to an MBSFN subframe of NCT, a configuration of the MBSFN subframe may be limited. In other words, a subframe performing an MBSFN operation may be limited to a downlink subframe in which an uplink grant is not transmitted. For example, in case of TDD, UL-DL configuration 2 corresponds to DSUDDDSUDD (D: downlink subframe, U: uplink subframe and S: special subframe) and the uplink grant may be transmitted in subframes #3 and #8. Moreover, since each of subframes #0, #1, #2, #5 and #6 may not be set to the MBSFN subframe in the TDD, the subframe performing the MBSFN operation may be limited to the subframes #4 and #9 in consideration of each of the subframes, which may not be set to the MBSFN subframe.

Examples of $1^{st}$ Subframe

A $1^{st}$ subframe mentioned in the foregoing description may include a subframe that will be explained in the following description as well as an MBSFN subframe of NCT.

The $1^{st}$ subframe may correspond to a subframe from which DCI cannot be stably detected due to inter-cell interference.

The $1^{st}$ subframe may correspond to a subframe in which resources used for a DCI transmission are insufficient due to a transmission of PMCH (physical multicast channel) and/or PRS (positioning reference signal) through a wideband. In other words, in the $1^{st}$ subframe, resources except a resource for at least one of the PMCH and the PRS may be smaller than those required for the DCI transmission. In this case, the DCI transmission includes a transmission through EPDCCH.

The $1^{st}$ subframe may correspond to a subframe in which the PMCH and/or a signal such as the PRS is transmitted using CP different from that of an existing subframe or a subframe having DCI transmitted therein. For instance, in case that EPDCCH of NCT is transmitted, a normal CP is used in the EPDCCH. However, since an extended CP is used in the PMCH/PRS, it may not be simultaneously transmitted in one subframe. In particular, the EPDCCH may be transmitted since extra resources exist despite PMCH/PRS transmission. In this case, if a CP length used in the PMCH/PRS is different from that used in the EPD-CCH, a reception may be difficult to be performed depending on UE.

The 1$^{st}$ subframe may correspond to a subframe, in which resources for a downlink transmission are insufficient, among TDD special subframes. For instance, it may correspond to each of special subframes #0 and #5 in case of the normal CP or each of special subframes #0 and #4 in case of the extended CP.

The 1$^{st}$ subframe may correspond to a subframe in which EPDCCH is not transmitted since it is difficult to define DMRS for the EPDCCH. For instance, special subframe #7 of the extended CP may correspond to the 1$^{st}$ subframe since EPDCCH transmission is impossible due to an incomplete DwPTS region.

If resources used for an EPDCCH transmission are insufficient or a control channel transmission is affected (e.g., DMRS transmission is affected) due to transmission of PSS/SSS/PBCH/SIB/paging signal, a related subframe may correspond to the 1$^{st}$ subframe.

The 1$^{st}$ subframe may correspond to a subframe included in a subframe set which is informed by a base station through upper layer signaling.

The above-mentioned description can be applied to DL assignment, PHICH, EPHICH and D2D as well as to DL grant. Moreover, it can be applied to a case that a specific subframe is used in TDD in a manner of changing usage of the specific subframe. Particularly, when a downlink subframe n is used for an uplink transmission in a manner of changing usage of the downlink subframe n, a base station may transmit an uplink grant for a subframe (n+4) in a downlink subframe ahead of the subframe n. Moreover, an uplink grant for the subframe n may be transmitted in a subframe (n−4) or a subframe ahead of the subframe (n−4).

Device Configuration According to the Embodiment of the Present Invention

Figure 9:
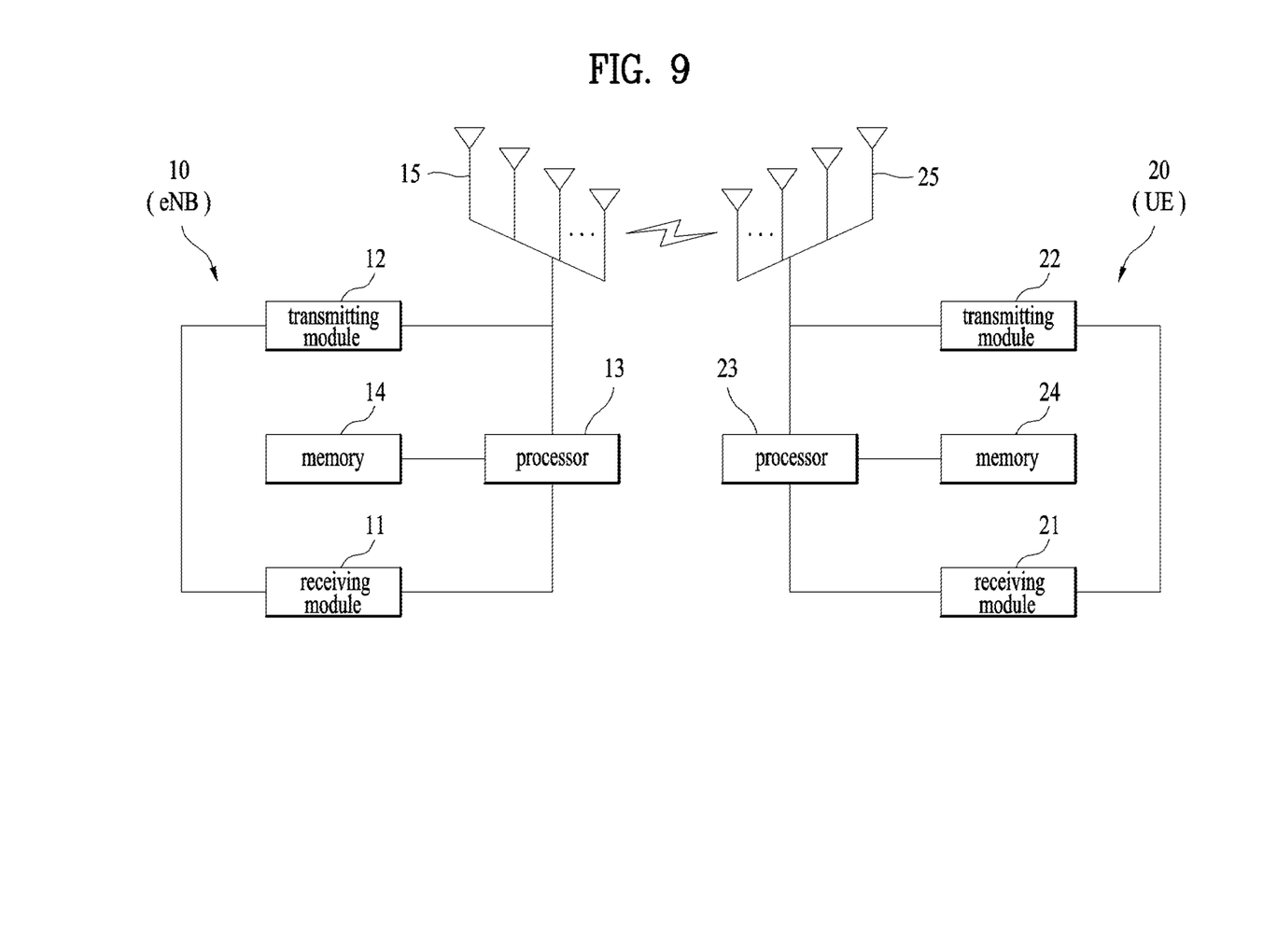
FIG. 9 is a diagram for configurations of transceiving devices.

FIG. 9 is a diagram for configurations of a transmitting point device and a user equipment device according to the present invention.

Referring to FIG. 9, a transmitting point device 10 according to the present invention may include a receiving module 11, a transmitting module 12, a processor 13, a memory 14 and a plurality of antennas 15. A plurality of the antennas 15 may mean a transmitting point device supportive of MIMO transmission and reception. The receiving module 11 can receive various signals, data and information in uplink from a user equipment. The transmitting module 12 can transmit various signals, data and information in downlink to the user equipment. And, the processor 13 can control overall operations of the transmitting point device 10.

The processor 13 of the transmitting point device 10 according to one embodiment of the present invention can process matters required for each of the embodiments mentioned in the foregoing description.

The processor 13 of the transmitting point device 10 performs functions of operating and processing information received by the transmitting point device 10, information to be externally transmitted by the transmitting point device 10, and the like. The memory 1114 can store the operated and processed information and the like for a prescribed period and can be substituted with such a component as a buffer (not shown in the drawing) and the like.

Referring to FIG. 9, a user equipment device 20 according to the present invention may include a receiving module 21, a transmitting module 22, a processor 23, a memory 24 and a plurality of antennas 25. A plurality of the antennas 25 may mean a user equipment device supportive of MIMO transmission and reception. The receiving module 21 can receive various signals, data and information in downlink from a base station. The transmitting module 22 can transmit various signals, data and information in uplink to the base station. And, the processor 23 can control overall operations of the user equipment device 20.

The processor 23 of the user equipment device 20 according to one embodiment of the present invention can process matters required for each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The above-mentioned detailed configurations of the transmitting point device 10 and the user equipment device 20 can be implemented so that the contents or items explained in the descriptions of the various embodiments of the present invention may be independently applied or at least two embodiments of the present invention may be simultaneously applied. And, redundant descriptions shall be omitted from the following description for clarity.

The description of the transmitting point device 10 with reference to FIG. 9 may be identically applicable to a relay node device as a downlink transmitting entity or an uplink receiving entity. And, the description of the user equipment device 20 with reference to FIG. 9 may be identically applicable to a relay node device as a downlink receiving entity or an uplink transmitting entity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforementioned embodiments of the present invention can be used by those skilled in the art in a manner of being combined with each other. Therefore, the present invention is non-limited by the embodiments disclosed herein but intends to give a broadest scope that matches the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description can apply to various kinds of mobile communication systems.

What is claimed is:

1. A method of transmitting an uplink (UL) signal, which is transmitted by a user equipment (UE) in a long term evolution (LTE) frequency division duplex (FDD) system, the method comprising:
receiving a downlink control information (DCI) in an N-th subframe including a UL grant for transmitting the UL signal; and
transmitting the UL signal using the UL grant, in at least one of an (N+4)-th subframe and an (M+4)-th subframe,
wherein an M-th subframe is a subframe in which both of a physical downlink control channel (PDCCH) and an enhanced PDCCH (EPDCCH) are not transmitted, and
wherein N and M are integers, and M is greater than N.

2. The method of claim 1, wherein the UL signal is transmitted in the (N+4)-th subframe when the DCI is masked with a UL scheduling-radio network temporary identifier (US-RNTI), and the UL signal is transmitted in the (M+4)-th subframe when the DCI is masked with another RNTI other than the US-RNTI.

3. The method of claim 1, wherein the UL signal is transmitted in the (N+4)-th subframe when a UL index field in the DCI is set to 01, the UL signal is transmitted in the (M+4)-th subframe when the UL index field is set to 10, and the UL signal is transmitted in both of the (N+4)-th subframe and the (M+4)-th subframe when the UL index field is set to 11.

4. The method of claim 1, wherein the M-th subframe is a multimedia broadcast single frequency network (MBSFN) subframe.

5. The method of claim 1, wherein the M-th subframe is a subframe in which resources except a resource for at least one of a physical multicast channel (PMCH) and a positioning reference signal (PRS) are smaller than those required for transmitting the DCI.

6. The method of claim 1, wherein the M-th subframe is a subframe in which either a physical multicast channel (PMCH) and a positioning reference signal (PRS) is transmitted using extended cyclic prefix (CP) and the DCI is transmitted using normal CP.

7. The method of claim 1, wherein the M-th subframe is indicated to the UE through an upper layer signaling.

8. A User Equipment (UE) for transmitting an uplink (UL) signal in a long term evolution (LTE) frequency division duplex (FDD) system, the UE comprising:
a Radio Frequency (RF) module; and
a processor operably coupled with the RF module and configured to:
receive a downlink control information (DCI) in an N-th subframe including a UL grant for transmitting the UL signal, and
transmit the UL signal using the UL grant, in at least one of an (N+4)-th subframe and an (M+4)-th subframe,
wherein an M-th subframe is a subframe in which both of a physical downlink control channel (PDCCH) and an enhanced PDCCH (EPDCCH) are not transmitted, and
wherein N and M are integers, and M is greater than N.

9. The UE according to claim 8, wherein the UL signal is transmitted in the (N+4)-th subframe when the DCI is masked with a UL scheduling-radio network temporary identifier (US-RNTI), and the UL signal is transmitted in the (M+4)-th subframe when the DCI is masked with another RNTI other than the US-RNTI.

10. The UE according to claim 8, wherein the UL signal is transmitted in the (N+4)-th subframe when a UL index field in the DCI is set to 01, the UL signal is transmitted in the (M+4)-th subframe when the UL index field is set to 10, and the UL signal is transmitted in both of the (N+4)-th subframe and the (M+4)-th subframe when the UL index field is set to 11.

11. The UE according to claim 8, wherein the M-th subframe is a multimedia broadcast single frequency network (MBSFN) subframe.

12. The UE according to claim 8, wherein the M-th subframe is a subframe in which resources except a resource for at least one of a physical multicast channel (PMCH) and a positioning reference signal (PRS) are smaller than those required for transmitting the DCI.

13. The UE according to claim 8, wherein the M-th subframe is a subframe in which either a physical multicast channel (PMCH) and a positioning reference signal (PRS) is transmitted using extended cyclic prefix (CP) and the DCI is transmitted using normal CP.

14. The UE according to claim 8, wherein the M-th subframe is indicated to the UE through an upper layer signaling.

* * * * *